(12) United States Patent
Lee et al.

(10) Patent No.: US 12,217,016 B2
(45) Date of Patent: Feb. 4, 2025

(54) ELECTRONIC APPARATUS FOR TRANSLATING VOICE INPUT USING NEURAL NETWORK MODELS AND METHOD FOR CONTROLLING THEREOF

(71) Applicant: SAMSUNG ELECTRONICS CO., LTD., Suwon-si (KR)

(72) Inventors: Beomseok Lee, Suwon-si (KR); Sathish Indurthi, Suwon-si (KR); Mohd Abbas Zaidi, Suwon-si (KR); Nikhil Kumar, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 325 days.

(21) Appl. No.: 17/746,238

(22) Filed: May 17, 2022

(65) Prior Publication Data
US 2022/0366157 A1    Nov. 17, 2022

(30) Foreign Application Priority Data

May 17, 2021 (KR) ........................ 10-2021-0063183
Dec. 15, 2021 (KR) ........................ 10-2021-0180154

(51) Int. Cl.
*G06F 40/58* (2020.01)
*G06F 40/284* (2020.01)
(Continued)

(52) U.S. Cl.
CPC ............ *G06F 40/58* (2020.01); *G06F 40/284* (2020.01); *G06F 40/44* (2020.01); *G10L 13/02* (2013.01); *G10L 15/16* (2013.01); *G10L 15/22* (2013.01)

(58) Field of Classification Search
CPC ......... G10L 15/16; G10L 15/22; G06F 40/40; G06F 40/47; G06F 40/58
See application file for complete search history.

(56) References Cited

U.S. PATENT DOCUMENTS 8,527,258 B2    9/2013   Kim et al.
11,301,625 B2   4/2022   Roh et al.
(Continued)

FOREIGN PATENT DOCUMENTS

KR   10-0713647 B1   5/2007
KR   10-1589433 B1   1/2016
(Continued)

OTHER PUBLICATIONS

Wang, Mingxuan, et al. "Memory-enhanced decoder for neural machine translation." arXiv preprint arXiv:1606.02003 (2016).*

(Continued)

*Primary Examiner* — Paras D Shah
(74) *Attorney, Agent, or Firm* — Sughrue Mion, PLLC

(57) ABSTRACT

An electronic apparatus, including a microphone; a memory configured to store at least one instruction; and a processor configured to: acquire a first token corresponding to a first user voice input in a first language acquired through the microphone, acquire a first text in a second language by inputting the first token into a first neural network model, acquire a feature value corresponding to a predicted subsequent token, which is predicted to be uttered after the first token, by inputting the first text into a second neural network model, and based on a second token being acquired subsequent to the first token, acquire a second text in the second language by inputting the first token, the second token, the first text, and the feature value into the first neural network model.

13 Claims, 8 Drawing Sheets

(51) Int. Cl.
*G06F 40/44* (2020.01)
*G10L 13/02* (2013.01)
*G10L 15/16* (2006.01)
*G10L 15/22* (2006.01)

(56) References Cited

U.S. PATENT DOCUMENTS

| 2017/0372693 A1 | 12/2017 | Rangarajan Sridhar et al. |
| 2020/0104371 A1 | 4/2020 | Ma et al. |
| 2020/0117715 A1* | 4/2020 | Lee .................. G06N 3/08 |

FOREIGN PATENT DOCUMENTS

| KR | 10-2018-0000089 A | 1/2018 |
| KR | 10-2020-0059625 A | 5/2020 |
| KR | 10-2021-0121818 A | 10/2021 |

OTHER PUBLICATIONS

Gulcehre, Caglar, et al. "On integrating a language model into neural machine translation." Computer Speech & Language 45 (2017): 137-148.*

Werlen, Lesly Miculicich, et al. "Self-attentive residual decoder for neural machine translation." arXiv preprint arXiv: 1709.04849 (2017).*

Alinejad, Ashkan, Maryam Siahbani, and Anoop Sarkar. "Prediction improves simultaneous neural machine translation." Proceedings of the 2018 Conference on Empirical Methods in Natural Language Processing. 2018.*

Dalvi, Fahim, et al. "Incremental decoding and training methods for simultaneous translation in neural machine translation." arXiv preprint arXiv:1806.03661 (2018).*

Arivazhagan, Naveen, et al. "Monotonic infinite lookback attention for simultaneous machine translation." arXiv preprint arXiv:1906.05218 (2019).*

Schneider, Felix, and Alex Waibel. "Towards stream translation: Adaptive computation time for simultaneous machine translation." Proceedings of the 17th International Conference on Spoken Language Translation. 2020.*

Wu, Xueqing, et al. "Learning to Use Future Information in Simultaneous Translation." (2020).*

Zhang, Shaolei, Yang Feng, and Liangyou Li. "Future-Guided Incremental Transformer for Simultaneous Translation." arXiv e-prints (2020): arXiv-2012.*

Yi Ren et al., "SimulSpeech: End-to-End Simultaneous Speech to Text Translation", Proceedings of the 58th Annual Meeting of the Association for Computational Linguistics, Jul. 2020, 10 pages total.

Mingbo Ma et al., "STACL: Simultaneous Translation with Implicit Anticipation and Controllable Latency using Prefix-to-Prefix Framework", Proceedings of the 57th Annual Meeting of the Association for Computational Linguistics, Jul.-Aug. 2019, 12 pages total.

Xutai Ma et al., "SimulMT to SimulST: Adapting Simultaneous Text Translation to End-to-End Simultaneous Speech Translation", Proceedings of the 1st Conference of the Asia-Pacific Chapter of the Association for Computational Linguistics and the 10th International Joint Conference on Natural Language Processing, Dec. 2020, 6 pages total.

Xutai Ma et al., "Monotonic Multihead Attention", arXiv:1909.12406v1 [cs.CL], Sep. 26, 2019, 11 pages total.

\* cited by examiner

ELECTRONIC APPARATUS FOR TRANSLATING VOICE INPUT USING NEURAL NETWORK MODELS AND METHOD FOR CONTROLLING THEREOF

CROSS-REFERENCE TO RELATED APPLICATION(S)

This application is based on and claims priority under 35 U.S.C. § 119 to Korean Patent Application No. 10-2021-0063183, filed on May 17, 2021, and Korean Patent Application No. 10-2021-0180154, filed on Dec. 15, 2021, in the Korean Intellectual Property Office, the disclosure of which is incorporated by reference herein in its entirety.

BACKGROUND

1. Field

The disclosure relates to an electronic apparatus and a method for controlling thereof, and more specifically to an electronic apparatus for acquiring an output sentence by performing machine translation on an input sentence, and a method for controlling thereof.

2. Description of Related Art

Recently, artificial intelligence systems have been used in various fields. Unlike the existing rule-based smart system, the artificial intelligence system is a system in which a machine learns, identifies, and becomes smarter by itself. As artificial intelligence systems are used, their recognition rate improves and the system can understand user's preferences more accurately. Thus, the existing rule-based smart systems are gradually being replaced by deep learning-based artificial intelligence systems.

Artificial intelligence technology consists of machine learning (e.g., deep learning) and elemental technologies using machine learning. Machine learning is an algorithm technology that categorizes/learns characteristics of input data by itself, and elemental technology is a technology for performing functions such as cognition, judgment, etc. of human brains using machine learning algorithms such as deep learning, etc., and consists of technical fields such as linguistic understanding, visual understanding, reasoning/prediction, knowledge expression, motion control, or the like. Particularly, linguistic understanding is a technology for recognizing and applying/processing human language/text, and includes natural language processing, machine translation, dialogue system, question answering, voice recognition/synthesis, or the like.

Recently, research on neural machine translation (NMT) using artificial intelligence has been actively conducted. Particularly, research on streaming NMT that translates words (or tokens) inputted in real time, rather than translating completed input sentences, is being actively conducted. In the streaming NMT, there are a reading operation that loads an input token into memory and a writing operation that translates the loaded input token to generate an output token. Translation performance or translation speed may be determined depending on which of the reading operation or the writing operation is performed for each time point.

Accordingly, in order to improve translation performance and translation speed, there is a need for a technique for determining which of the reading operation and the writing operation to perform, that is, a decision making method.

SUMMARY

Provided are methods, devices, and systems for acquiring a neural network model with improved translation performance and translation speed.

Additional aspects will be set forth in part in the description which follows and, in part, will be apparent from the description, or may be learned by practice of the presented embodiments.

In accordance with an aspect of the disclosure, an electronic apparatus includes a microphone; a memory configured to store at least one instruction; and a processor configured to: acquire a first token corresponding to a first user voice input in a first language acquired through the microphone, acquire a first text in a second language by inputting the first token into a first neural network model, acquire a feature value corresponding to a predicted subsequent token, which is predicted to be uttered after the first token, by inputting the first text into a second neural network model, and based on a second token being acquired subsequent to the first token, acquire a second text in the second language by inputting the first token, the second token, the first text, and the feature value into the first neural network model.

Based on an input token of the first language being inputted into the first neural network model, the first neural network model may be trained to acquire text of the second language corresponding to the input token, or to identify an additional input token in addition to the input token.

The first neural network model may further include a first encoder and a first decoder, and, based on a context vector being acquired by inputting the input token into the first encoder, the first decoder may be trained to acquire the text of the second language corresponding to the input token.

The first decoder may be configured to, based on a probability value acquired based on the context vector being greater than a predetermined value, acquire the text of the second language corresponding to the input token, and based on the probability value acquired based on the context vector being less than the predetermined value, identify an additional token in addition to the input token.

The first neural network model may include a first attention module configured to acquire a first vector corresponding to a first feature between a plurality of input tokens inputted into the first neural network model, and a second attention module configured to acquire a second vector corresponding to a second feature between the plurality of input tokens, and the first neural network model may be trained to acquire the second text in the second language based on the first vector and the second vector.

The electronic apparatus may further include a display, and the processor may be further configured to control the display to display the first text and the second text.

The electronic apparatus may further include a speaker, and the processor may be further configured to control the speaker to output a voice message corresponding to the first text and the second text.

In accordance with an aspect of the disclosure, a method for controlling an electronic apparatus includes acquiring a first token corresponding to a first user voice input in a first language; acquiring a first text in a second language by inputting the first token into a first neural network model; acquiring a feature value corresponding to a predicted subsequent token, which is predicted to be uttered after the first token, by inputting the first text into a second neural network model; and based on a second token being acquired subsequent to the first token, acquiring a second text in the second language by inputting the first token, the second token, the first text, and the feature value into the first neural network model.

Based on an input token of the first language being inputted into the first neural network model, the first neural network model to acquire text of the second language corresponding to the input token or to identify an additional input token in addition to the input token.

The first neural network model may further include a first encoder and a first decoder, and, based on a context vector being acquired by inputting the input token into the first encoder, the first decoder may be configured to acquire the text of the second language corresponding to the input token.

The first decoder is configured to, based on a probability value acquired based on the context vector being greater than a predetermined value, acquire the text of the second language corresponding to the input token, and based on the probability value acquired based on the context vector being less than the predetermined value, identify an additional token in addition to the input token.

The first neural network model may include a first attention module configured to acquire a first vector corresponding to a first feature between a plurality of input tokens inputted into the first neural network model, and a second attention module configured to acquire a second vector corresponding to a second feature between the plurality of input tokens, and wherein the first neural network model may be trained to acquire the second text in the second language based on the first vector and the second vector.

The method may further include displaying the first text and the second text.

The method may further include outputting a voice message corresponding to the first text and the second text.

In accordance with an aspect of the disclosure, a non-transitory computer-readable recording medium stores a program which, when executed by at least one processor, causes the at least one processor to: acquire a first token corresponding to a first user voice input in a first language; acquire a first text in a second language by inputting the first token into a first neural network model; acquire a feature value corresponding to a predicted subsequent token predicted, which is predicted to be uttered after the first token, by inputting the first text into a second neural network model; and based on a second token being acquired subsequent to the first token, acquire a second text in the second language by inputting the first token, the second token, the first text, and the feature value into the first neural network model.

According to various embodiments of the disclosure as described above, the electronic apparatus may acquire an output sentence in which an input sentence is translated using a neural network model having improved translation performance and translation speed.

In addition, effects acquired or predicted by the various example embodiments will be disclosed directly or implicitly in the detailed description below. For example, various effects predicted according to embodiments of the disclosure will be disclosed in the detailed description to be described below.

The other aspects, advantages and features of the disclosure will become apparent to those skilled in the art from the following detailed description, which discloses various embodiments of the disclosure taken in conjunction with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in describing various example embodiments will be briefly explained, and various example embodiments will be described in greater detail with reference to the accompanying drawings.

Terms used in the disclosure are selected as general terminologies currently widely used in consideration of the configuration and functions of the disclosure, but may be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, based on it being identified that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions may not be described in detail where they would obscure the disclosure with unnecessary detail.

Figure 1:
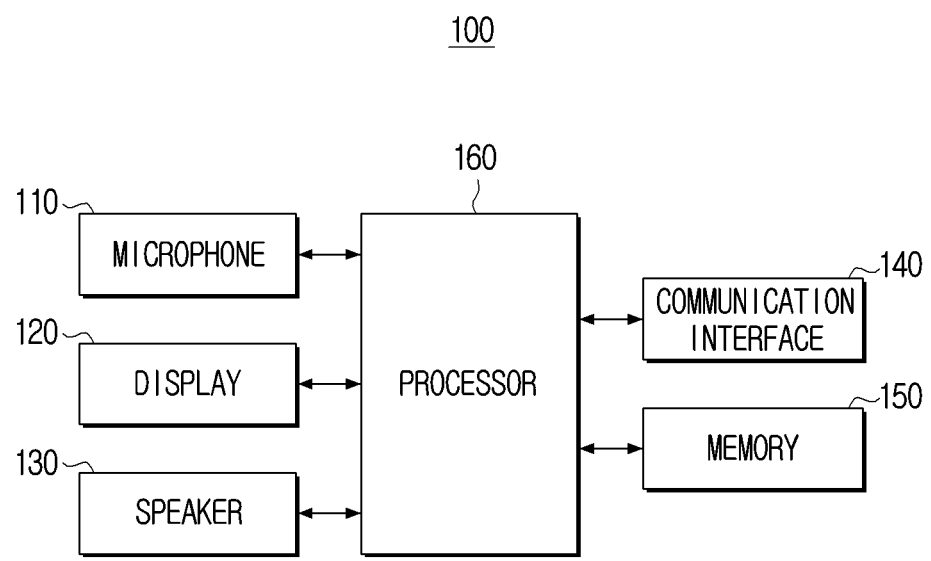
FIG. 1 is a block diagram illustrating an example configuration of an electronic apparatus according to an embodiment.

FIG. 1 is a block diagram illustrating an example configuration of an electronic apparatus according to an embodiment.

Referring to FIG. 1, the electronic apparatus 100 may include a microphone 110, a display 120, a speaker 130, a communication interface 140, a memory 150, and a processor 160. For example, the electronic apparatus 100 may be a user terminal.

The microphone 110 may acquire a user voice, for example as a user voice input. For example, the microphone 110 may be formed integrally with an upper side, a front direction, a side direction, or the like of the electronic apparatus 100. The microphone 110 may include various configurations such as a microphone that collects analog user voice, an amplifier circuit that amplifies the collected user voice input, an A/D conversion circuit that samples the amplified user voice input and converts the user voice input into a digital signal, a filter circuit for removing noise components from the converted digital signal, or the like.

The display 120 may display text corresponding to the user voice. For example, the display 120 may display a first text corresponding to a user voice in a first language. Alternatively, the display 120 may display a second text of a second language in which the first text is translated. The display 120 may be implemented as a liquid crystal display panel (LCD), organic light emitting diodes (OLED), a flexible display, a transparent display, or the like. However, the display 120 according to the disclosure is not limited to a specific type.

The speaker 130 may output audio under the control of the processor 160. For example, the speaker 130 may output a voice message corresponding to an output sentence. The output sentence may be a sentence of the second language (or target language) acquired based on an input sentence of the first language (or source language).

The communication interface 140 may include at least one communication circuit and may communicate with various types of external devices or external servers. For example, the communication interface 140 may transmit a feature vector corresponding to the user voice of the electronic apparatus 100 to the external device or receive a feature vector corresponding to the user voice of the external device from the external device. The communication interface 140 may include at least one of a Wi-Fi communication module, a cellular communication module, a 3rd generation (3G) mobile communication module, a 4th generation (4G) mobile communication module, and a 4th generation Long term evolution (LTE) mobile communication module, a 5th generation (5G) mobile communication module.

The memory 150 may store an operating system (OS) for controlling the overall operation of components of the electronic apparatus 100 and commands or data related to the components of the electronic apparatus 100. For example, the memory 150 may store information on a first neural network model and information on a second neural network model. The first neural network model may be learned, or trained, to output an output sentence of the second language based on the input sentence of the first language. The first neural network model may be a monotonic multi-head attention (MMA) model. The second neural network model may be trained to output information on a subsequent token predicted to be acquired after an output token acquired at a previous point in time. The second neural network model may be a language model (LM). The memory 150 may be implemented as a non-volatile memory (e.g., a hard disk, a solid state drive (SSD), a flash memory), a volatile memory, or the like.

The processor 160 may be electrically connected to the memory 150 to control overall functions and operations of the electronic apparatus 100. The processor 160 may acquire a first user voice in the first language acquired through the microphone 110. For example, the first language may be English. The processor 160 may acquire a first token corresponding to the first user voice. A token means a character string having a meaning. For example, a token may mean a word or a sentence.

The processor 160 may acquire a first text of the second language by inputting the first token into the first neural network model. For example, the second language may be Korean. The first neural network model may be trained to acquire text in the second language corresponding to the input token or to identify an additional input token in addition to the input token, based on the input token of the first language input to the first neural network model.

The first neural network model may include a first encoder and a first decoder. The first decoder may be trained to acquire a text of the second language corresponding to the input token based on a context vector acquired by inputting the input token to the first encoder. The first decoder may be trained to acquire the text of the second language corresponding to the input token in response to a probability value being acquired based on the context vector is greater than a predetermined value, and to identify additional tokens in addition to the input token based on the probability value being less than the predetermined value. The probability value may be acquired based on a function defined based on the context vector acquired through the first encoder.

The first neural network model may include a plurality of modules learned to acquire vectors corresponding to a plurality of features among a plurality of input tokens. For example, the first neural network model may include a first attention module for acquiring a first vector corresponding to a first feature between the plurality of input tokens. The first feature may be a grammatical relationship between the plurality of input tokens. The first neural network model may include a second attention module for acquiring a second vector corresponding to a second feature between the plurality of input tokens. The second feature may mean a semantic relationship between the plurality of input tokens. The first neural network model may be trained to acquire a second text in a second language based on the first vector and the second vector.

The processor 160 may output at least one text acquired by using the first neural network model. For example, the processor 160 may control the display 120 to display at least one text. Alternatively, the processor 160 may control the speaker 130 to output a voice message corresponding to at least one text.

Functions related to artificial intelligence according to the disclosure may operate through the processor 160 and the memory 150. The processor 160 may include one or a plurality of processors. In this example, one or the plurality of processors may include, for example, and without limitation, a general-purpose processor such as a CPU, AP, or a digital signal processor (DSP), a graphics-only processor such as a GPU, a vision processing unit (VPU), or an artificial intelligence-only processor such as an NPU. One or more processors control to process input data according to a predefined operation rule or artificial intelligence model stored in the memory 150. Based on one or the plurality of processors being artificial intelligence-only processors, the artificial intelligence-only processor may be designed with a hardware structure specialized for processing a specific artificial intelligence model.

The predefined operation rule or artificial intelligence model is characterized in that it is generated through learning. Being generated through learning may refer, for example, to a basic artificial intelligence model being learned using a plurality of learning data by a learning algorithm, such that the predefined operation rule or artificial intelligence model set to perform a desired feature (or purpose) is generated. Such learning may be performed in a device itself on which the artificial intelligence according to the disclosure is performed, or may be performed through a separate server and/or system. Examples of the learning algorithm include, for example, and without limitation, supervised learning, unsupervised learning, semi-supervised learning, or reinforcement learning, but are not limited to the examples described above.

The artificial intelligence model may be generated through learning. The artificial intelligence model may be composed of a plurality of neural network layers. Each of the plurality of neural network layers may have a plurality of weight values, and perform a neural network operation through an operation result of a previous layer and a plurality of weights. The plurality of weights of the plurality of neural network layers may be optimized by the learning result of the artificial intelligence model. For example, the plurality of weights may be updated to reduce or minimize a loss value or a cost value acquired from the artificial intelligence model during the learning process.

The artificial neural network may include, for example, and without limitation, a deep neural network (DNN), such as convolutional neural network (CNN), deep neural network (DNN), recurrent neural network (RNN), generative adversarial network (GAN), restricted Boltzmann machine (RBM), deep belief network (DBN), bidirectional recurrent deep neural network (BRDNN), or deep Q-Networks, or the like, but is not limited to the embodiment described above.

Meanwhile, the electronic apparatus 100 may include an adaptive echo canceller (AEC) module, a noise suppression (NS) module, and an end-point detection (EPD) module for pre-processing the user voice, or may include an automatic gain control (AGC) module. Also, the electronic apparatus 100 may include a digital signal processor (DSP) that converts an analog audio signal into a digital signal or converts a stored digital image or digital audio signal into an analog signal.

Figure 2:
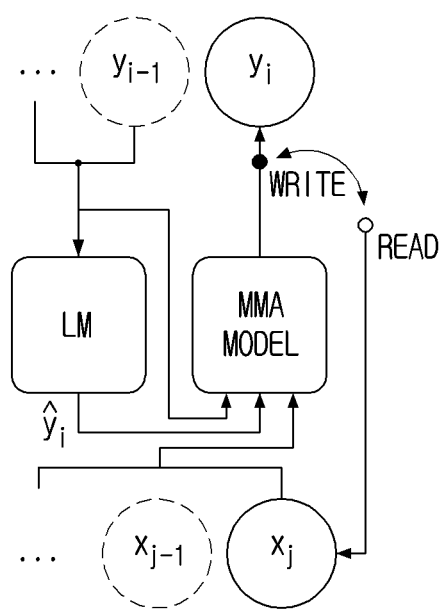
FIG. 2 is a view illustrating a method of acquiring output text according to an embodiment.

FIG. 2 is a view illustrating a method of acquiring output text according to an embodiment.

Referring to FIG. 2, the electronic apparatus 100 may acquire a feature value $\hat{y}_i$ corresponding to a present point in time by inputting an output text $y_{i-n}, \ldots, y_{i-1}$ up to a time point before the present point in time into a second neural network model, which may be for example the LM. The feature value $\hat{y}_i$ may correspond to a subsequent word (or token) predicted to be uttered at the present point in time.

The electronic apparatus 100 may acquire an output text $y_i$ corresponding to the present point in time or identify an input token $x_j$ corresponding to the present point in time by inputting the output text $y_{i-n}, \ldots, y_{i-1}$ up to the previous point in time, the input token $x_{j-n}, \ldots, x_{j-1}$ up to the previous point in time, and the feature value $\hat{y}_i$ to a first neural network model, which may be, for example, the MMA Model. The first neural network model (for example the MMA Model) may perform a read operation of identifying an input token based on input data and loading it into a memory, or a write operation of generating an output token by translating the loaded input token.

For example, in response to a probability value being acquired based on a context vector identified based on the input token $x_{j-n}, \ldots, x_{j-1}$ is greater than a predetermined value, the first neural network model (for example the MMA Model) may generate the output text by performing the write operation. Based on the probability value being smaller than the predetermined value, the first neural network model (for example the MMA Model) may identify the input token $x_j$ and load it into the memory by performing the read operation. The probability value may be related to the amount of information input to the first neural network model (for example the MMA Model). For example, based on information input to the first neural network model (for example the MMA Model) at the present point in time being sufficient to generate output text (i.e., when translation quality is identified to be above a predetermined level), the first neural network model (MMA) may generate output text. Meanwhile, based on the information input to the first neural network model (for example the MMA Model) at the present point in time being insufficient to generate the output text (i.e., when the translation quality is identified to be lower than the predetermined level), the first neural network model (for example the MMA Model) may identify additional input tokens.

The existing translation model does not consider the feature value $\hat{y}_i$ acquired through the second neural network model (for example the LM) when generating output text. However, the electronic apparatus 100 according to the disclosure acquires the output text $y_i$ by using the feature value $\hat{y}i$ corresponding to a word predicted by the second neural network model (for example the LM). Accordingly, the output text $y_i$ acquired through the first neural network model (for example the MMA Model) may have superior quality compared to the output text acquired through the existing translation model.

Meanwhile, the first neural network model (for example the MMA Model) and the second neural network model (for example the LM) may be integrated into one neural network model. In addition, data type of the input token may be text, but is not limited thereto, and may be audio data type.

Figure 3:
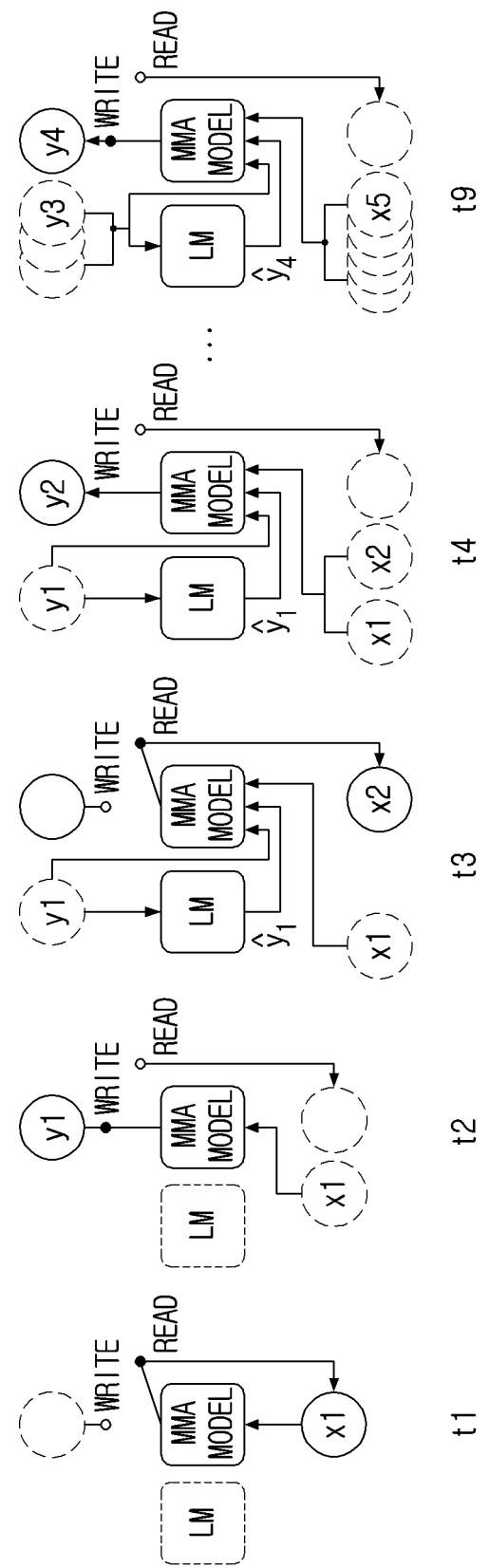
FIG. 3 is a view illustrating a method of acquiring output text according to an embodiment.

FIG. 3 is a view illustrating a method of acquiring output text according to an embodiment.

Referring to FIG. 3, at a first time point t1, the first neural network model (for example the MMA Model) may identify a first token x1 by performing a read operation At a second time point t2, the electronic apparatus 100 may acquire a first text y1 by inputting the first token x1 into the first neural network model (for example the MMA Model). In this case, the first neural network model (for example the MMA Model) may generate the first text y1 by performing a write operation.

At a third time point t3, the electronic apparatus 100 may acquire a first feature value $\hat{y}_1$ by inputting the first text y1 into the second neural network model LM. The electronic apparatus 100 may input the first token x1, the first text y1, and the first feature value $\hat{y}_1$ into the first neural network model (for example the MMA Model). In this case, the first neural network model (for example the MMA Model) may identify the second token x2 by performing a read operation.

At a fourth time point t4, the electronic apparatus 100 may acquire a second text y2 by inputting the first token x1, the second token x2, the first text y1, and the first feature value $\hat{y}_1$ into the first neural network model LM. In this case, the first neural network model (for example the MMA Model) may generate the second text y2 by performing a write operation.

At a ninth time point t9, the electronic apparatus 100 may identify a fourth feature value $\hat{y}_4$ by inputting the first text y1, the second text y2, and the third text y3 into the second neural network model LM. The electronic apparatus 100 may acquire the fourth feature value y4 by inputting the first token x1, the second token x2, a third token x3, a fourth token x4, a fifth token x5, the first text y1, the second text y2, a third text y3, and the fourth feature value $\hat{y}_4$ into the first neural network model MMA Model.

In this way, the electronic apparatus 100 may acquire text of the second language from an input token of the first language.

Figure 4:
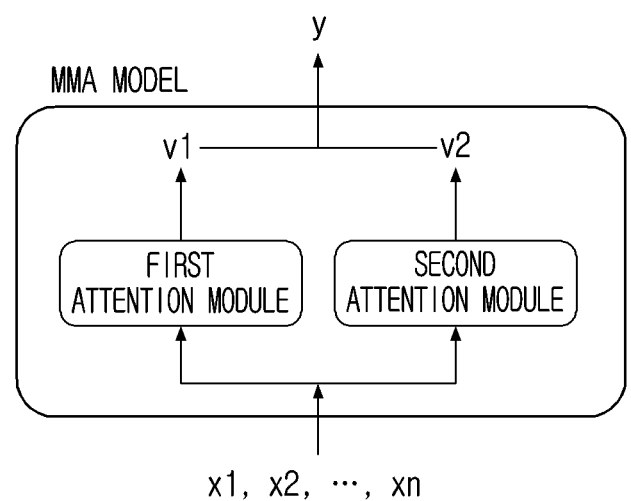
FIG. 4 is a view illustrating a first neural network model according to an embodiment.

FIG. 4 is a view illustrating a first neural network model according to an embodiment.

Referring to FIG. 4, the first neural network model (for example the MMA Model) may include a first attention module and a second attention module. The first attention module and the second attention module are modules for acquiring information on features between input tokens x1, x2, . . . , xn. For example, the first attention module may output a first vector v1 indicating a grammatical relationship between the input tokens x1, x2, . . . , xn. The second attention module may output a second vector v2 indicating a semantic relationship between x1, x2, . . . , xn. The first neural network model (for example the MMA Model) may acquire output text y based on the first vector v1 and the second vector v2.

Figure 5:
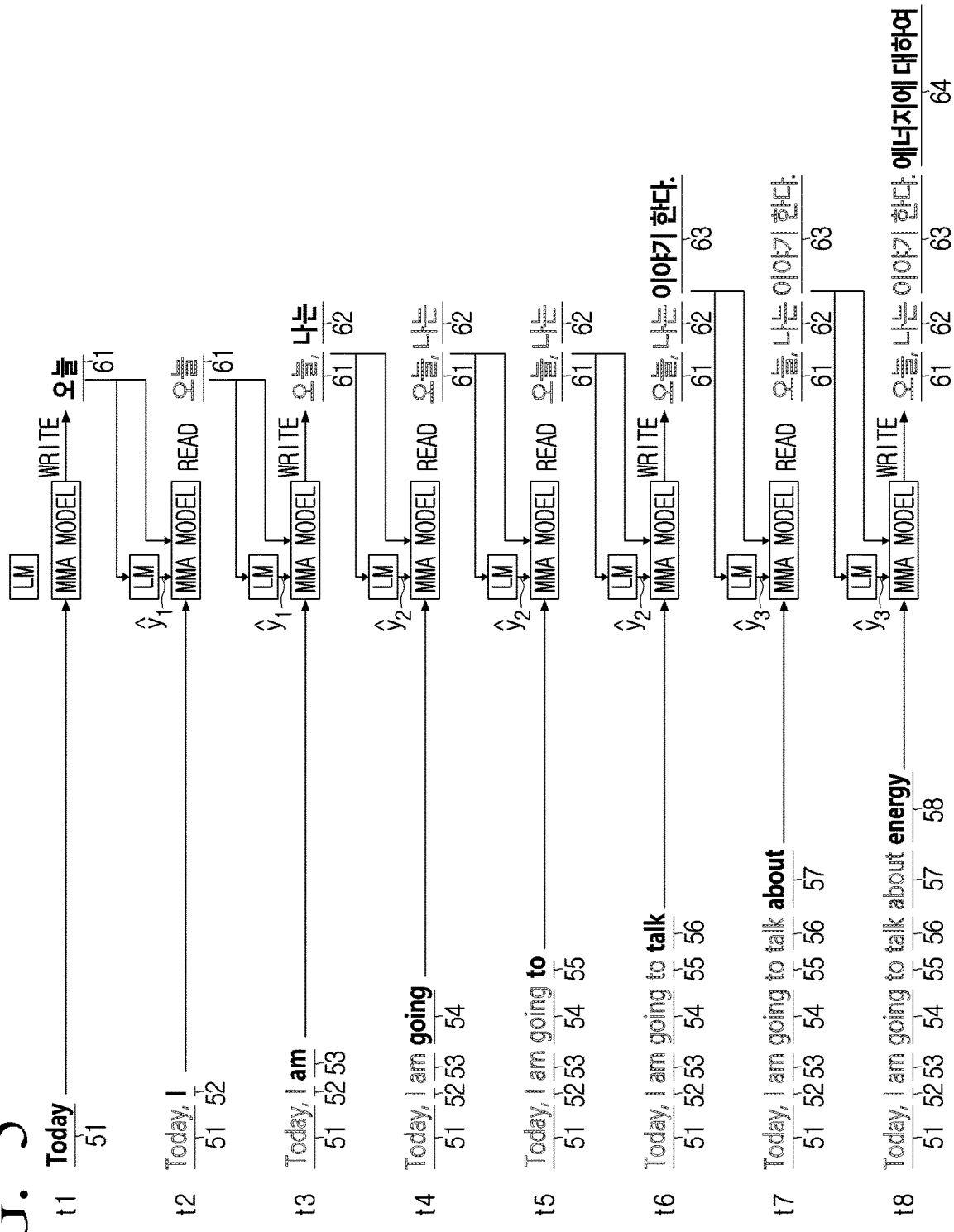
FIG. 5 is a view illustrating a method of acquiring output text according to an embodiment.

FIG. 5 is a view illustrating a method of acquiring output text according to an embodiment.

Referring to FIG. 5, the electronic apparatus 100 may acquire output texts 61 to 64 of a second language based on input tokens 51 to 58 of the first language acquired in real time using the first neural network model (for example the MMA Model) and the second neural network model (for example the LM).

At a first time point t1, the electronic apparatus 100 may acquire a first input token 51 based on a user voice in the first language. The electronic apparatus 100 may acquire a first output text 61 by inputting the first input token 51 into the first neural network model (for example the MMA Model). In this case, the first neural network model (for example the MMA Model) may generate the first output text 61 by performing a write operation.

At a second time point t2, the electronic apparatus 100 may acquire a second input token 52 following the first input token 51. The electronic apparatus 100 may acquire a first feature value $\hat{y}_1$ by inputting the first output text 61 into the second neural network model LM. The electronic apparatus 100 may input the first input token 51, the second input token 52, the first output text 61, and the first feature value $\hat{y}_1$ into the first neural network model (for example the MMA Model). The first neural network model (for example the MMA Model) may identify a third input token 53 following the second input token 52 by performing a read operation without generating new output text.

At a third time point t3, the electronic apparatus 100 may acquire a second output text 62 by inputting the first input token 51, the second input token 52, the third input token 53, the first output text 61, and the first feature value $\hat{y}_1$ into the first neural network model (for example the MMA Model). In this case, the first neural network model (for example the MMA Model) may generate the second output text 62 by performing a write operation.

At a fourth time point t4, the electronic apparatus 100 may acquire a fourth input token 54 following the third input token 53. The electronic apparatus 100 may acquire the second feature value $\hat{y}_2$ by inputting the first output text 61 and the second output text 62 into the second neural network model LM. The electronic apparatus 100 may input the first input token 51, the second input token 52, the third input token 53, the fourth input token 54, the first output text 61, the second output text 62, and the second feature value $\hat{y}_2$ into the first neural network model (for example the MMA Model). The first neural network model (for example the MMA Model) may identify a fifth input token 55 by performing a read operation without generating new output text.

At a fifth time point t5, the electronic apparatus 100 may input the first input token 51, the second input token 52, the third input token 53, the fourth input token 54, the fifth input token 55, the first output text 61, the second output text 62, and the second feature value $\hat{y}_2$ into the first neural network model (for example the MMA Model). The first neural network model (for example the MMA Model) may identify a sixth input token 56 following the fifth input token 55 by performing a read operation without generating new output text.

At a sixth time point t6, the electronic apparatus 100 may acquire a third output text 63 by inputting the first input token 51, the second input token 52, the third input token 53, the fourth input token 54, and the fifth input token 55, the sixth input token 56, the first output text 61, the second output text 62, and the second feature value $\hat{y}_2$. The first neural network model (for example the MMA Model) may generate the third output text 63 by performing a write operation.

At a seventh time point t7, the electronic apparatus 100 may acquire a seventh input token 57 following the sixth input token 56. The electronic apparatus 100 may acquire the third feature value $\hat{y}_3$ by inputting the first output text 61, the second output text 62, and the third output text 63 into the second neural network model LM The electronic apparatus 100 may input the first input token 51, the second input token 52, the third input token 53, the fourth input token 54, the fifth input token 55, the sixth input token 56, the seventh input token 57, the first output text 61, the second output text 62, the third output text 63, and the third feature value $\hat{y}_3$. The first neural network model (for example the MMA Model) may identify an eighth input token 58 following the seventh input token 57 by performing a read operation without generating new output text.

At an eighth time point t8, the electronic apparatus 100 may acquire a fourth output text 64 by inputting the first input token 51, the second input token 52, the third input token 53, the fourth input token 54, and the fifth input token 55, the sixth input token 56, the seventh input token 57, an eighth input token 58, the first output text 61, the second output text 62, the third output text 63, and the third feature value $\hat{y}_3$ into the first neural network model (for example the MMA Model). The first neural network model (for example the MMA Model) may generate the fourth output text 64 by performing a write operation.

Figure 6:
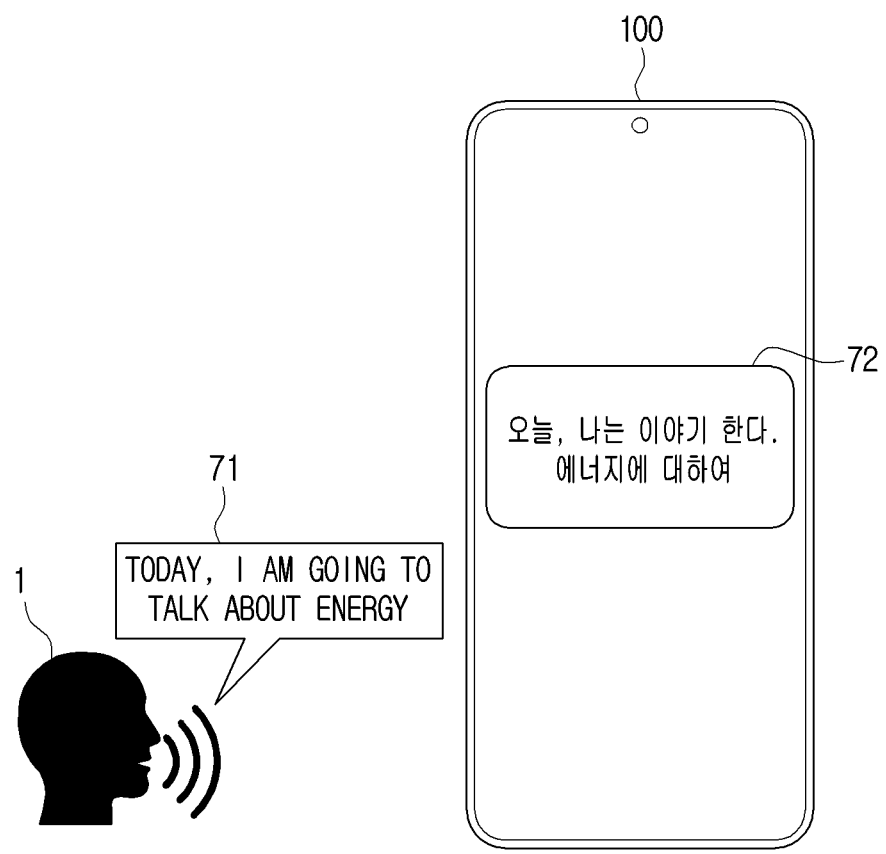
FIG. 6 is a view illustrating a text output method of an electronic apparatus according to an embodiment.
Figure 7:
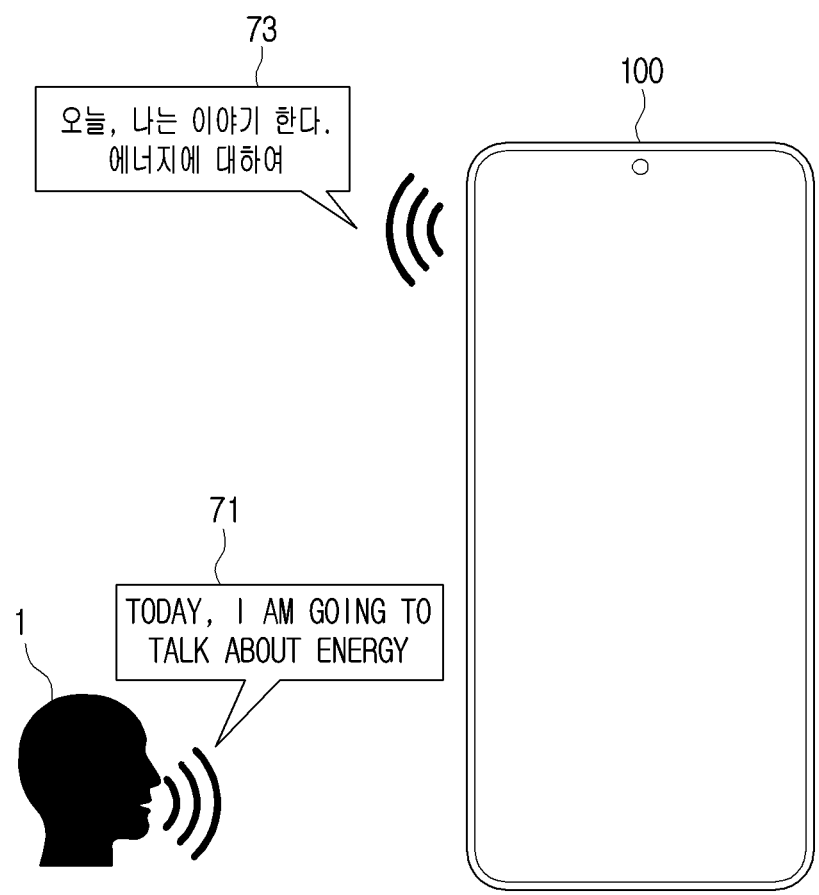
FIG. 7 is a view illustrating a text output method of an electronic apparatus according to an embodiment.

FIGS. 6 and 7 are views illustrating a text output method of an electronic apparatus according to an embodiment.

Referring to FIG. 6, the electronic apparatus 100 may acquire a user voice 71 of a first language uttered by a user 1. The electronic apparatus 100 may acquire text 72 of the second language based on the user voice 71. The electronic apparatus 100 may display the acquired text 72.

Referring to FIG. 7, the electronic apparatus 100 may output a voice message 73 corresponding to the text 72 acquired based on the user voice 71.

Figure 8:
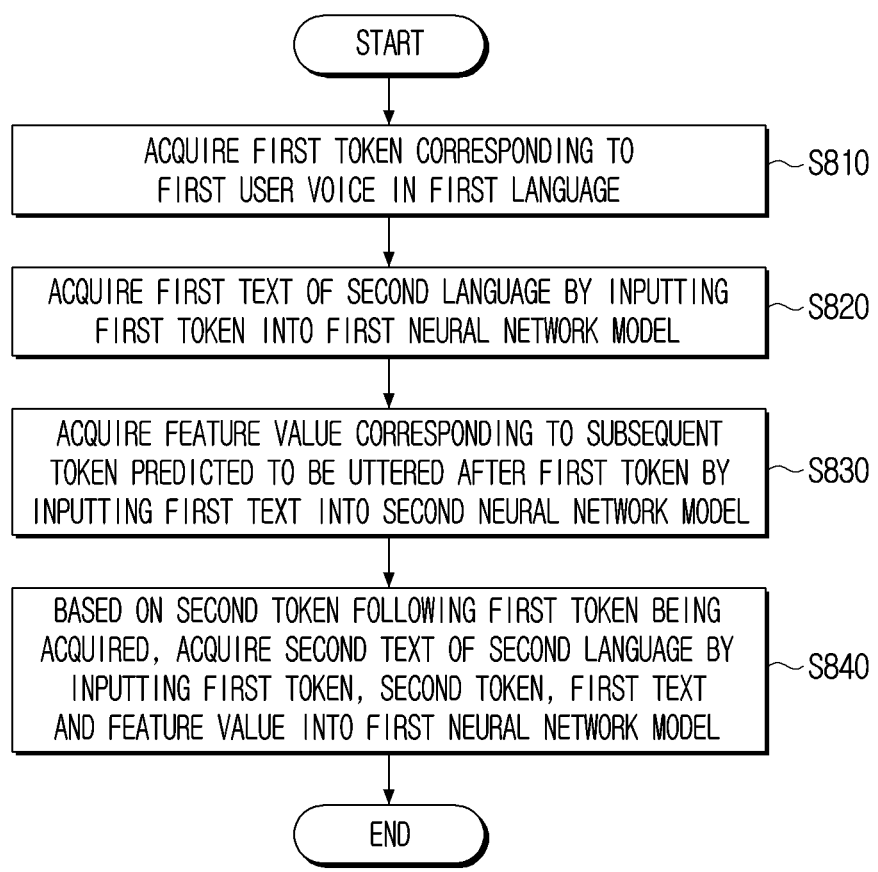
FIG. 8 is a flowchart illustrating a method of controlling an electronic apparatus according to an embodiment.

FIG. 8 is a flowchart illustrating a method of controlling an electronic apparatus according to an embodiment.

Referring to FIG. 8, the electronic apparatus 100 may acquire a first token corresponding to a first user voice in a first language (S810). The first token may be audio data or text corresponding to the first user voice.

The electronic apparatus 100 may acquire a first text of a second language by inputting the first token into a first neural network model (S820). The first neural network model may be a neural network model learned to acquire text in a second language based on an input token in the first language or to identify an additional input token in addition to the input token. The first neural network model may include a first encoder that outputs a context vector based on the input token and a first decoder that generates an output text based on the context vector. The first decoder may generate an output text or identify the additional input token according to a probability value acquired based on the context vector. For example, based on the probability value being greater than a predetermined value, the first decoder may acquire text of the second language corresponding to the input token. Meanwhile, based on the probability value being smaller than the predetermined value, the first decoder may identify an additional token in addition to the input token.

The first neural network model may include a first attention module for acquiring a first vector corresponding to a first feature between a plurality of input tokens and a second attention module for acquiring a second vector corresponding to a second feature between the plurality of input tokens. For example, the first feature may be a grammatical relationship between the plurality of input tokens. The second feature may mean a semantic relationship between the plurality of input tokens. The first neural network model may generate a second text in a second language based on the first vector and the second vector.

The electronic apparatus 100 may acquire a feature value corresponding to a subsequent token predicted to be uttered after the first token by inputting the first text into the second neural network model (S830). The second neural network model may be trained to predict text that will follow the input text based on the input text.

Based on a second token following the first token being acquired, the electronic apparatus 100 may acquire the second text of the second language by inputting the first token, the second token, the first text and the feature value into the first neural network model (S840). The electronic apparatus 100 may input the input token acquired up to the present point in time, output text acquired up to the present point in time, and the feature value into the first neural network model. The first neural network model may perform a write operation of generating output text or a read operation of identifying an additional input token based on input information.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the disclosure According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above based on being executed by the processor of the particularly device.

The non-transitory computer-readable medium does not refer to a medium that stores data for a short period of time, such as a register, cache, memory, etc., but semi-permanently stores data and is available of reading by the device. For example, the non-transitory computer-readable medium may include, for example, and without limitation, a CD, DVD, a hard disc, Blu-ray disc, USB, a memory card, ROM, or the like.

The machine-readable storage media may be provided in a form of a non-transitory storage media. The term "non-transitory storage medium may refer to a tangible device and does not include a signal (e.g., electromagnetic wave), and the term does not distinguish between the case that the data is permanently stored in the storage medium and the case that the data is temporarily stored in the storage medium. For example, the "non-transitory storage medium" may include a buffer in which data is temporarily stored.

According to an embodiment, the method according to various embodiments disclosed in the disclosure may be provided as being included in a computer program product. The computer program product may be traded between a seller and a buyer. The computer program product may be distributed in the form of a device-readable storage medium (e.g., compact disc read only memory (CD-ROM)) or through application stores (e.g., Play Store™), or may be distributed (e.g., downloaded or uploaded) directly or online between two user devices (e.g., smartphones). In the case of online distribution, at least some of the computer program products (e.g. downloadable apps) may be temporarily stored on a storage medium readable by a device, such as a manufacturer's server, an application store's server, or a relay server, or may be temporarily generated.

While the disclosure has been illustrated and described with reference to various example embodiments, it will be understood that the various example embodiments are intended to be illustrative, not limiting. It will be understood by those skilled in the art that many alternatives, modifications, and variations may be made without departing from the true spirit and full scope of the disclosure, including the appended claims and their equivalents.

What is claimed is:

1. An electronic apparatus comprising:
a microphone;
a memory configured to store at least one instruction; and
a processor configured to:
acquire a first token corresponding to a first user voice input in a first language acquired through the microphone,
acquire a first text in a second language by inputting the first token into a first neural network model,
acquire a feature value corresponding to a predicted subsequent token, which is predicted to be uttered after the first token, by inputting the first text into a second neural network model, and based on a second token being acquired subsequent to the first token, acquire a second text in the second language by inputting the first token, the second token, the first text, and the feature value into the first neural network model, wherein the first neural network model acquires the second text based on a first feature related to a grammatical relationship between the first token and the second token, a second feature related to a semantic relationship between the first token and the second token and the feature value corresponding to the predicted subsequent token.

2. The electronic apparatus of claim 1, wherein based on an input token of the first language being inputted into the first neural network model, the first neural network model is trained to acquire text of the second language corresponding to the input token, or to identify an additional input token in addition to the input token.

3. The electronic apparatus of claim 2, wherein the first neural network model further comprises a first encoder and a first decoder, and wherein, based on a context vector being acquired by inputting the input token into the first encoder, the first decoder is trained to acquire the text of the second language corresponding to the input token.

4. The electronic apparatus of claim 3, wherein the first decoder is configured to, based on a probability value acquired based on the context vector being greater than a predetermined value, acquire the text of the second language corresponding to the input token, and based on the probability value acquired based on the context vector being less than the predetermined value, identify an additional token in addition to the input token.

5. The electronic apparatus of claim 1, further comprising a display, wherein the processor is further configured to control the display to display the first text and the second text.

6. The electronic apparatus of claim 1, further comprising: a speaker, wherein the processor is further configured to control the speaker to output a voice message corresponding to the first text and the second text.

7. A method for controlling an electronic apparatus comprising:

acquiring a first token corresponding to a first user voice input in a first language;

acquiring a first text in a second language by inputting the first token into a first neural network model;

acquiring a feature value corresponding to a predicted subsequent token, which is predicted to be uttered after the first token, by inputting the first text into a second neural network model; and based on a second token being acquired subsequent to the first token, acquiring a second text in the second language by inputting the first token, the second token, the first text, and the feature value into the first neural network model, wherein the first neural network model acquires the second text based on a first feature related to a grammatical relationship between the first token and the second token, a second feature related to a semantic relationship between the first token and the second token and the feature value corresponding to the predicted subsequent token.

8. The method of claim 7, wherein, based on an input token of the first language being inputted into the first neural network model, the first neural network model to acquire text of the second language corresponding to the input token or to identify an additional input token in addition to the input token.

9. The method of claim 8, wherein the first neural network model further comprises a first encoder and a first decoder, and wherein, based on a context vector being acquired by inputting the input token into the first encoder, the first decoder is configured to acquire the text of the second language corresponding to the input token.

10. The method of claim 9, wherein the first decoder is configured to, based on a probability value acquired based on the context vector being greater than a predetermined value, acquire the text of the second language corresponding to the input token, and based on the probability value acquired based on the context vector being less than the predetermined value, identify an additional token in addition to the input token.

11. The method of claim 7, further comprising displaying the first text and the second text.

12. The method of claim 7, further comprising outputting a voice message corresponding to the first text and the second text.

13. A non-transitory computer-readable recording medium storing a program which, when executed by at least one processor, causes the at least one processor to:

acquire a first token corresponding to a first user voice input in a first language;

acquire a first text in a second language by inputting the first token into a first neural network model;

acquire a feature value corresponding to a predicted subsequent token predicted, which is predicted to be uttered after the first token, by inputting the first text into a second neural network model; and based on a second token being acquired subsequent to the first token, acquire a second text in the second language by inputting the first token, the second token, the first text, and the feature value into the first neural network model, wherein the first neural network model acquires the second text based on a first feature related to a grammatical relationship between the first token and the second token, a second feature related to a semantic relationship between the first token and the second token and the feature value corresponding to the predicted subsequent token.

* * * * *